United States Patent
Cattoni et al.

(10) Patent No.: US 10,568,060 B2
(45) Date of Patent: Feb. 18, 2020

(54) USING A WLAN INTERWORKING GATEWAY (WIG) FOR OFFLOADING UE TRAFFIC FROM CELLULAR NETWORK TO WLAN

(71) Applicant: Nokia Solutions and Networks Oy, Espoo (FI)

(72) Inventors: Andrea Cattoni, Nibe (DK); Claudio Rosa, Randers (DK); Daniela Laselva, Klarup (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 3 days.

(21) Appl. No.: 15/565,236

(22) PCT Filed: Apr. 15, 2015

(86) PCT No.: PCT/EP2015/058125
§ 371 (c)(1),
(2) Date: Oct. 9, 2017

(87) PCT Pub. No.: WO2016/165751
PCT Pub. Date: Oct. 20, 2016

(65) Prior Publication Data
US 2018/0084518 A1 Mar. 22, 2018

(51) Int. Cl.
*H04L 12/28* (2006.01)
*H04W 60/04* (2009.01)
(Continued)

(52) U.S. Cl.
CPC ......... *H04W 60/04* (2013.01); *H04L 61/2007* (2013.01); *H04L 61/2038* (2013.01);
(Continued)

(58) Field of Classification Search
CPC ............. H04L 61/2007; H04L 61/2038; H04L 61/6022; H04W 36/0066; H04W 60/04;
(Continued)

(56) References Cited

U.S. PATENT DOCUMENTS

| | | |
|---|---|---|
| 7,356,015 B2 | 4/2008 | Ibe et al. |
| 2006/0002355 A1 | 1/2006 | Baek et al. |

(Continued)

FOREIGN PATENT DOCUMENTS

| | | |
|---|---|---|
| WO | 2005/002267 A2 | 1/2005 |
| WO | 2016/070921 A1 | 5/2016 |

OTHER PUBLICATIONS

"New WI proposal: Network Controlled WLAN/3GPP Interworking", 3GPP TSG-RAN meeting #63, RP-140694, Agenda: 14.1.2, China Telecom, Mar. 3-6, 2014, 5 pages.
(Continued)

*Primary Examiner* — Abdelillah Elmejjarmi
(74) *Attorney, Agent, or Firm* — Squire Patton Boggs (US) LLP

(57) ABSTRACT

There is provided a method comprising receiving, at a control node associated with a plurality of access points of a first network (e.g. a WLAN Interworking Gateway—WIG), information from an access point of a second network (e.g. an eNB of a LTE network), wherein the received information is useable by the control node to perform at least one association procedure (e.g. AP selection, local IP and MAC address assignment, admission control, authentication) with an access point of the first network (e.g. WLAN) on behalf of a user equipment, said user equipment being associated with the second network, performing said at least one association procedure and providing association procedure information to the access point of the second network.

11 Claims, 10 Drawing Sheets

(51) Int. Cl.
*H04W 36/00* (2009.01)
*H04L 29/12* (2006.01)
*H04W 8/08* (2009.01)
*H04W 84/12* (2009.01)
*H04W 88/06* (2009.01)
*H04W 36/14* (2009.01)
*H04W 36/22* (2009.01)

(52) U.S. Cl.
CPC ....... *H04W 8/082* (2013.01); *H04W 36/0066* (2013.01); *H04L 61/6022* (2013.01); *H04W 36/0038* (2013.01); *H04W 36/14* (2013.01); *H04W 36/22* (2013.01); *H04W 84/12* (2013.01); *H04W 88/06* (2013.01)

(58) Field of Classification Search
CPC . H04W 8/082; H04W 36/0038; H04W 36/14; H04W 36/22; H04W 84/12; H04W 88/06
See application file for complete search history.

(56) References Cited

U.S. PATENT DOCUMENTS

| | | | |
|---|---|---|---|
| 2011/0223885 A1* | 9/2011 | Salkintzis | H04W 36/0016 455/411 |
| 2012/0196609 A1* | 8/2012 | Barreto | H04W 72/0406 455/450 |
| 2012/0230191 A1* | 9/2012 | Fang | H04W 36/22 370/235 |
| 2014/0273958 A1* | 9/2014 | Messana | H04L 63/0884 455/411 |

OTHER PUBLICATIONS

"New SI Proposal: LTE-WLAN Radio Level Integration", 3GPP TSG-RAN meeting #65, RP-141276, Agenda: 14.1.2, Intel Corporation, Sep. 9-12, 2014, 6 pages.

"Study Item Proposal on E-UTRAN and WLAN Aggregation", 3GPP TSG-RAN meeting #65, RP-141400, Agenda: 14.1.2, Qualcomm Incorporated, Sep. 9-12, 2014, 6 pages.

"3rd Generation Partnership Project; Technical Specification Group Services and System Aspects; Architecture enhancements for non-3GPP accesses (Release 13)", 3GPP TS 23.402, V13.0.0, Dec. 2014, pp. 1-290.

"3rd Generation Partnership Project; Technical Specification Group Services and System Aspects; Mobility between 3GPP-Wireless Local Area Network (WLAN) interworking and 3GPP systems (Release 12)", 3GPP TS 23.327, V12.0.0, Sep. 2014, pp. 1-27.

"3rd Generation Partnership Project; Technical Specification Group Radio Access Network; Study on Wireless Local Area Network (WLAN)—3GPP radio interworking (Release 12)", 3GPP TR 37.834, V12.0.0, Dec. 2013, pp. 1-17.

DROMS, "Dynamic Host Configuration Protocol", RFC 1531, Network Working Group, Oct. 1993, pp. 1-40.

DROMS, "Dynamic Host Configuration Protocol", RFC 1541, Network Working Group, Oct. 1993, pp. 1-39.

Rekhter et al., "Address Allocation for Private Internets", RFC 1918, Network Working Group, Feb. 1996, pp. 1-9.

Srisuresh et al., "IP Network Address Translator (NAT) Terminology and Considerations", RFC 2663, Network Working Group, Aug. 1999, pp. 1-30.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)", 3GPP TS 36.300, V12.4.0, Dec. 2014, pp. 1-251.

"Proposed PAR: P802c—Overview and Architecture—Amendment: Local Media Access Control (MAC) Addressing", IEEE, Retrieved on Oct. 5, 2017, Webpage available at : http://grouper.ieee.org/groups/802/PrivRecsg/email/msg00048.html.

"MAC Authentication Bypass", CISCO, Deployment Guide, May 2011, 23 pages.

International Search Report and Written Opinion received for corresponding Patent Cooperation Treaty Application No. PCT/EP2015/058125, dated Dec. 17, 2015, 19 pages.

"3rd Generation Partnership Project; Technical Specification Group Services and System Aspects; 3GPP System Architecture Evolution (SAE); Security architecture (Release 13)", 3GPP TS 33.401, V13.2.0, Mar. 2016, pp. 1-146.

"3rd Generation Partnership Project; Technical Specification Group Radio Access Network; Evolved Universal Terrestrial Radio Access Network (E-UTRAN) and Wireless LAN (WLAN);Xw application protocol (XwAP) (Release 13)", 3GPP TS 36.463, V2.0.0, Mar. 2016, pp. 1-93.

"LS on LTE-WLAN Aggregation", 3GPP TSG SA WG3 (Security) Meeting #82, S3-160272, SA3, Feb. 1-5, 2016, 1 page.

"TS 36.463, Draft version 1.4.0", 3GPP TSG-RAN WG3#91, R3-160452, Qualcomm Incorporated, Agenda Item: 15.4, Feb. 15-19, pp. 1-3.

* cited by examiner

USING A WLAN INTERWORKING GATEWAY (WIG) FOR OFFLOADING UE TRAFFIC FROM CELLULAR NETWORK TO WLAN

RELATED APPLICATION

This application was originally filed as PCT Application No. PCT/EP2015/058125 filed Apr. 15, 2015.

FIELD

The present application relates to a method, apparatus, system and computer program and in particular but not exclusively, to LTE-WLAN interworking.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of communications between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases.

SUMMARY

In a first aspect there is provided a method comprising receiving, at a control node associated with a plurality of access points of a first network, information from an access point of a second network, wherein the received information is useable by the control node to perform at least one association procedure with an access point of the first network on behalf of a user equipment, said user equipment being associated with the second network, performing said at least one association procedure and providing association procedure information to the access point of the second network.

The received information may comprise identity information associated with at least one of the user equipment and at least one access point of the first network.

The received information may comprise identity information associated with a plurality of access points of the first network, each of the plurality of access points of the first network providing coverage to the user equipment.

The association procedure may comprise selecting the access point of the first network for the user equipment to associate with in dependence on load information associated with each of the plurality of access points of the first network, and the association procedure information comprises an indication of the selected access point of the first network to the access point.

Said identity information may comprise a media access control address.

The method may comprise receiving said information useable by the control node in a request message from the access point of the second network for at least one of offloading and initiating radio aggregation for the user equipment with the first network and providing the association procedure information as a response to the request message.

The association procedure may comprise determining identity information applicable in the first network for the user equipment, and the association procedure information comprises an indication of the determined identity information applicable in the first network for the user equipment.

Determining the identity information applicable in the first network for the user equipment may comprise determining at least one of a local media access control address and a local internet protocol address to be assigned to the user equipment.

The association procedure may comprise performing admission control to determine whether the user equipment is permitted to associate with the first network and upon deciding that the user equipment is not permitted to associate with the first network, indicating the determination to the access point of the second network.

The association procedure may comprise performing an authentication procedure for the user equipment with the access point of the first network.

The authentication procedure may comprise sending an unsolicited authorization message to the access point of the first network, the authorization message comprising identity information associated with the user equipment.

The method may comprise receiving identity information from the user equipment, said identity information being associated with the second network.

The first network may be a wireless local area network. The second network may be a cellular network.

In a second aspect there is provided a method comprising causing information to be sent to a control node associated with a plurality of access points of a first network from an access point of a second network, wherein the information to be sent is useable by the control node to perform at least one association procedure with an access point of the first network on behalf of a user equipment, said user equipment being associated with the second network and receiving association procedure information from the control node in response to sending said information useable by the control node.

The information to be sent may comprise identity information associated with at least one of the user equipment and at least one access point of the first network.

The information to be sent may comprise identity information associated with a plurality of access points of the first network, each of the plurality of access points of the first network providing coverage to the user equipment.

The identity information may comprise a media access control address.

The method may comprise determining said information to be sent in dependence on information received from the user equipment.

The method may comprise causing said information to be sent in a request message for at least one of offloading and initiating radio aggregation for the user equipment with the first network and receiving the association procedure information as a response to the request message.

The association procedure may comprise selecting, at the control node, an access point of the first network for the user equipment to associate with and wherein the association procedure information comprises an indication of the selected access point of the first network.

The association procedure information may comprise an indication of identity information applicable for the user equipment in the first network, said identity information applicable for the user equipment in the first network being determined at the control node.

The identity information application in the first network for the user equipment may comprise at least one of a local media access control address and a local internet protocol address to be assigned to the user equipment.

The method may comprise receiving an indication that the user equipment is not permitted to associate with the first network.

The method may comprise causing an indication to be sent to the user equipment to associate with the first network, the indication comprising at least a portion of the association procedure information.

The method may comprise causing identity information associated with the user equipment to be transmitted to the access point of the first network.

The first network may be a wireless local area network. The second network may be a cellular network.

In a third aspect there is provided an apparatus, said apparatus comprising means for receiving, at a control node associated with a plurality of access points of a first network, information from an access point of a second network, wherein the received information is useable by the control node to perform at least one association procedure with an access point of the first network on behalf of a user equipment, said user equipment being associated with the second network, means for performing said at least one association procedure and means for providing association procedure information to the access point of the second network.

The received information may comprise identity information associated with at least one of the user equipment and at least one access point of the first network.

The received information may comprise identity information associated with a plurality of access points of the first network, each of the plurality of access points of the first network providing coverage to the user equipment.

The association procedure may comprise selecting the access point of the first network for the user equipment to associate with in dependence on load information associated with each of the plurality of access points of the first network, and the association procedure information comprises an indication of the selected access point of the first network to the access point.

Said identity information may comprise a media access control address.

The apparatus may comprise means for receiving said information useable by the control node in a request message from the access point of the second network for at least one of offloading and initiating radio aggregation for the user equipment with the first network and means for providing the association procedure information as a response to the request message.

The association procedure may comprise determining identity information applicable in the first network for the user equipment, and the association procedure information comprises an indication of the determined identity information applicable in the first network for the user equipment.

Determining the identity information applicable in the first network for the user equipment may comprise determining at least one of a local media access control address and a local internet protocol address to be assigned to the user equipment.

The association procedure may comprise performing admission control to determine whether the user equipment is permitted to associate with the first network and upon deciding that the user equipment is not permitted to associate with the first network, indicating the determination to the access point of the second network.

The association procedure may comprise performing an authentication procedure for the user equipment with the access point of the first network.

The authentication procedure may comprise sending an unsolicited authorization message to the access point of the first network, the authorization message comprising identity information associated with the user equipment.

The apparatus may comprise means for receiving identity information from the user equipment, said identity information being associated with the second network.

The first network may be a wireless local area network. The second network may be a cellular network.

In a fourth aspect there is provided an apparatus, said apparatus comprising means for causing information to be sent to a control node associated with a plurality of access points of a first network from an access point of a second network, wherein the information to be sent is useable by the control node to perform at least one association procedure with an access point of the first network on behalf of a user equipment, said user equipment being associated with the second network and means for receiving association procedure information from the control node in response to sending said information useable by the control node.

The information to be sent may comprise identity information associated with at least one of the user equipment and at least one access point of the first network.

The information to be sent may comprise identity information associated with a plurality of access points of the first network, each of the plurality of access points of the first network providing coverage to the user equipment.

The identity information may comprise a media access control address.

The apparatus may comprise means for determining said information to be sent in dependence on information received from the user equipment.

The apparatus may comprise means for causing said information to be sent in a request message for at least one of offloading and initiating radio aggregation for the user equipment with the first network and receiving the association procedure information as a response to the request message.

The association procedure may comprise selecting, at the control node, an access point of the first network for the user equipment to associate with and wherein the association procedure information comprises an indication of the selected access point of the first network.

The association procedure information may comprise an indication of identity information applicable for the user equipment in the first network, said identity information applicable for the user equipment in the first network being determined at the control node.

The identity information application in the first network for the user equipment may comprise at least one of a local media access control address and a local internet protocol address to be assigned to the user equipment.

The apparatus may comprise means for receiving an indication that the user equipment is not permitted to associate with the first network.

The apparatus may comprise means for causing an indication to be sent to the user equipment to associate with the first network, the indication comprising at least a portion of the association procedure information.

The apparatus may comprise means for causing identity information associated with the user equipment to be transmitted to the access point of the first network.

The first network may be a wireless local area network. The second network may be a cellular network.

In a fifth aspect an apparatus comprising at least one processor and at least one memory including a computer program code, the at least one memory and the computer program code configured to, with the at least one processor, cause the apparatus at least to receive, at a control node associated with a plurality of access points of a first network, information from an access point of a second network, wherein the received information is useable by the control node to perform at least one association procedure with an access point of the first network on behalf of a user equipment, said user equipment being associated with the second network, perform said at least one association procedure and provide association procedure information to the access point of the second network.

The received information may comprise identity information associated with at least one of the user equipment and at least one access point of the first network.

The received information may comprise identity information associated with a plurality of access points of the first network, each of the plurality of access points of the first network providing coverage to the user equipment.

The association procedure may comprise selecting the access point of the first network for the user equipment to associate with in dependence on load information associated with each of the plurality of access points of the first network, and the association procedure information comprises an indication of the selected access point of the first network to the access point.

Said identity information may comprise a media access control address.

The apparatus may be configured to receive said information useable by the control node in a request message from the access point of the second network for at least one of offloading and initiating radio aggregation for the user equipment with the first network and provide the association procedure information as a response to the request message.

The association procedure may comprise determining identity information applicable in the first network for the user equipment, and the association procedure information comprises an indication of the determined identity information applicable in the first network for the user equipment.

The apparatus may be configured to determine at least one of a local media access control address and a local internet protocol address to be assigned to the user equipment.

The association procedure may comprise performing admission control to determine whether the user equipment is permitted to associate with the first network and upon deciding that the user equipment is not permitted to associate with the first network, indicating the determination to the access point of the second network.

The association procedure may comprise performing an authentication procedure for the user equipment with the access point of the first network.

The authentication procedure may comprise sending an unsolicited authorization message to the access point of the first network, the authorization message comprising identity information associated with the user equipment.

The apparatus may be configured to receive identity information from the user equipment, said identity information being associated with the second network.

The first network may be a wireless local area network. The second network may be a cellular network.

In a sixth aspect an apparatus comprising at least one processor and at least one memory including a computer program code, the at least one memory and the computer program code configured to, with the at least one processor, cause the apparatus at least to cause information to be sent to a control node associated with a plurality of access points of a first network from an access point of a second network, wherein the information to be sent is useable by the control node to perform at least one association procedure with an access point of the first network on behalf of a user equipment, said user equipment being associated with the second network and receive association procedure information from the control node in response to sending said information useable by the control node.

The information to be sent may comprise identity information associated with at least one of the user equipment and at least one access point of the first network.

The information to be sent may comprise identity information associated with a plurality of access points of the first network, each of the plurality of access points of the first network providing coverage to the user equipment.

The identity information may comprise a media access control address.

The apparatus may be configured to determine said information to be sent in dependence on information received from the user equipment.

The apparatus may be configured to cause said information to be sent in a request message for at least one of offloading and initiating radio aggregation for the user equipment with the first network and receive the association procedure information as a response to the request message.

The association procedure may comprise selecting, at the control node, an access point of the first network for the user equipment to associate with and wherein the association procedure information comprises an indication of the selected access point of the first network.

The association procedure information may comprise an indication of identity information applicable for the user equipment in the first network, said identity information applicable for the user equipment in the first network being determined at the control node.

The identity information application in the first network for the user equipment may comprise at least one of a local media access control address and a local internet protocol address to be assigned to the user equipment.

The apparatus may be configured to receive an indication that the user equipment is not permitted to associate with the first network.

The apparatus may be configured to cause an indication to be sent to the user equipment to associate with the first network, the indication comprising at least a portion of the association procedure information.

The apparatus may be configured to cause identity information associated with the user equipment to be transmitted to the access point of the first network.

The first network may be a wireless local area network. The second network may be a cellular network.

In a seventh aspect a computer program embodied on a non-transitory computer-readable storage medium, the computer program comprising program code for controlling a process to execute a process, the process comprising receiving, at a control node associated with a plurality of access points of a first network, information from an access point of a second network, wherein the received information is useable by the control node to perform at least one association procedure with an access point of the first network on behalf of a user equipment, said user equipment being associated with the second network, performing said at least one association procedure and providing association procedure information to the access point of the second network.

The received information may comprise identity information associated with at least one of the user equipment and at least one access point of the first network.

The received information may comprise identity information associated with a plurality of access points of the first network, each of the plurality of access points of the first network providing coverage to the user equipment.

The association procedure may comprise selecting the access point of the first network for the user equipment to associate with in dependence on load information associated with each of the plurality of access points of the first network, and the association procedure information comprises an indication of the selected access point of the first network to the access point.

Said identity information may comprise a media access control address.

The process may comprise receiving said information useable by the control node in a request message from the access point of the second network for at least one of offloading and initiating radio aggregation for the user equipment with the first network and providing the association procedure information as a response to the request message.

The association procedure may comprise determining identity information applicable in the first network for the user equipment, and the association procedure information comprises an indication of the determined identity information applicable in the first network for the user equipment.

Determining the identity information applicable in the first network for the user equipment may comprise determining at least one of a local media access control address and a local internet protocol address to be assigned to the user equipment.

The association procedure may comprise performing admission control to determine whether the user equipment is permitted to associate with the first network and upon deciding that the user equipment is not permitted to associate with the first network, indicating the determination to the access point of the second network.

The association procedure may comprise performing an authentication procedure for the user equipment with the access point of the first network.

The authentication procedure may comprise sending an unsolicited authorization message to the access point of the first network, the authorization message comprising identity information associated with the user equipment.

The process may comprise receiving identity information from the user equipment, said identity information being associated with the second network.

The first network may be a wireless local area network. The second network may be a cellular network.

In an eighth aspect a computer program embodied on a non-transitory computer-readable storage medium, the computer program comprising program code for controlling a process to execute a process, the process comprising causing information to be sent to a control node associated with a plurality of access points of a first network from an access point of a second network, wherein the information to be sent is useable by the control node to perform at least one association procedure with an access point of the first network on behalf of a user equipment, said user equipment being associated with the second network and receiving association procedure information from the control node in response to sending said information useable by the control node.

The information to be sent may comprise identity information associated with at least one of the user equipment and at least one access point of the first network.

The information to be sent may comprise identity information associated with a plurality of access points of the first network, each of the plurality of access points of the first network providing coverage to the user equipment.

The identity information may comprise a media access control address.

The process may comprise determining said information to be sent in dependence on information received from the user equipment.

The process may comprise causing said information to be sent in a request message for at least one of offloading and initiating radio aggregation for the user equipment with the first network and receiving the association procedure information as a response to the request message.

The association procedure may comprise selecting, at the control node, an access point of the first network for the user equipment to associate with and wherein the association procedure information comprises an indication of the selected access point of the first network.

The association procedure information may comprise an indication of identity information applicable for the user equipment in the first network, said identity information applicable for the user equipment in the first network being determined at the control node.

The identity information application in the first network for the user equipment may comprise at least one of a local media access control address and a local internet protocol address to be assigned to the user equipment.

The process may comprise receiving an indication that the user equipment is not permitted to associate with the first network.

The process may comprise causing an indication to be sent to the user equipment to associate with the first network, the indication comprising at least a portion of the association procedure information.

The process may comprise causing identity information associated with the user equipment to be transmitted to the access point of the first network.

The first network may be a wireless local area network. The second network may be a cellular network.

In a ninth aspect there is provided a computer program product for a computer, comprising software code portions for performing the steps the method of any one of the first and/or second aspects when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
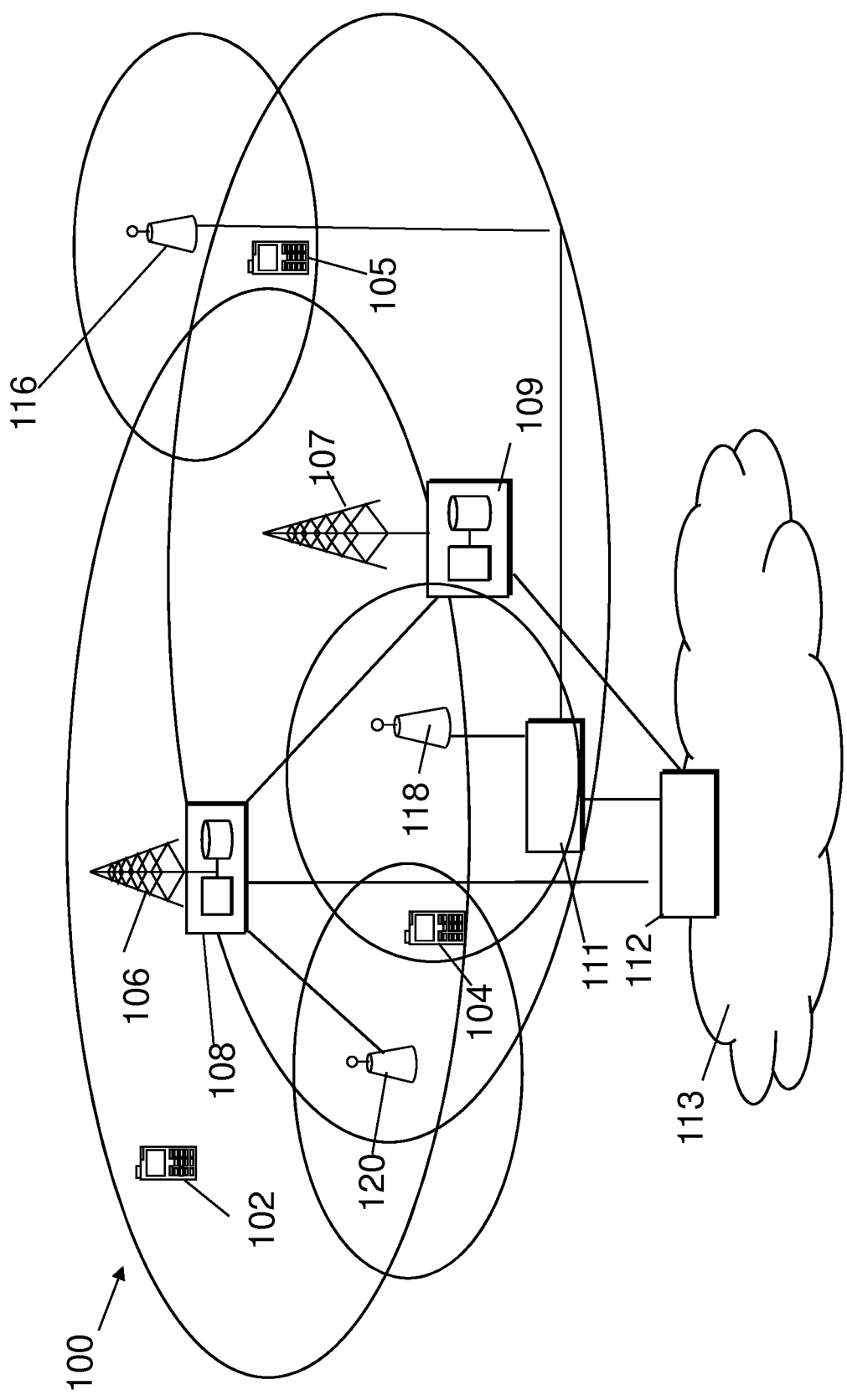
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
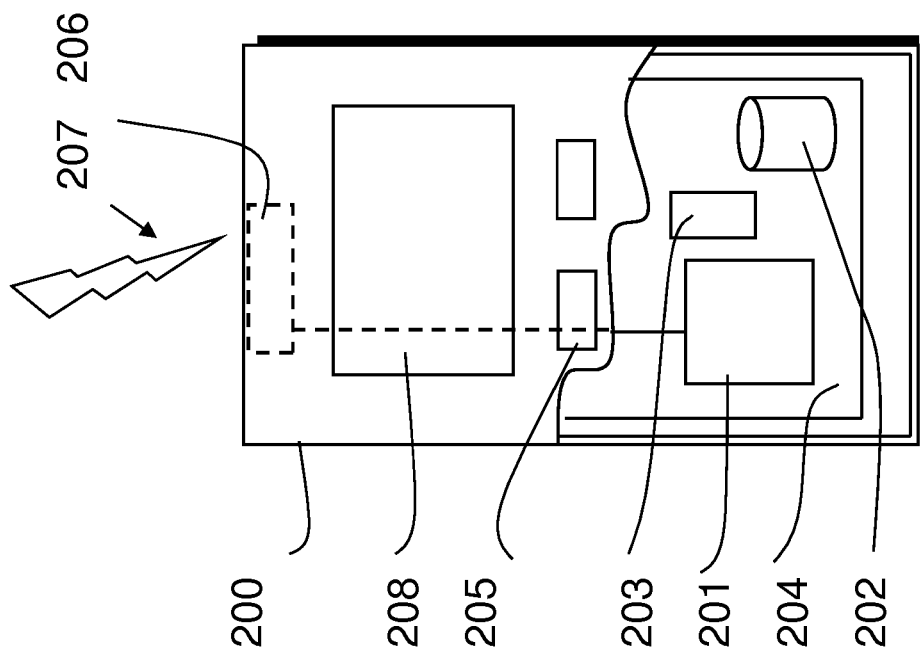
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

The following relates to both loose and tight LTE-WLAN interworking. Packet-wise aggregation between LTE and WLAN may be performed and the UE served simultaneously by both radio networks. Extending the benefits of integrated LTE-WLAN access to non-collocated scenarios where the LTE eNB and WLAN Access Point (AP) may be connected through non-ideal backhauls have been considered. Conceptually, this may be similar to LTE dual connectivity (DC) bearer split functionality (a.k.a. option 3C) recently standardized in 3GPP. In this scenario, the LTE eNB may act as the master node and the WLAN AP as the slave node. A proper combination of the data payload would be required at the UE side. LTE-WLAN radio aggregation proposals aim to provide support for network-control mechanisms which enable spectrum aggregation gains (including fine load balancing between LTE and WLAN).

Since Release 8 3GPP specifications have supported seamless service continuation upon radio access technology (RAT) change between Wi-Fi and 3GPP access networks including UMTS and LTE.

Rel12 RAN assisted WLAN interworking enables the cellular network to trigger dynamic traffic offload and onload (to and from WLAN), which is UE-driven and RAN-assisted. The onload/offload will occur if certain conditions of the RAN network and the WLAN network are met, in terms of e.g. cell load and signal strength.

A WLAN Interworking Gateway (WIG) comprises a set of functionalities that may be separate to or integrated in existing WLAN Access Gateways (WAGs). A protocol stack for allowing reliable transmission over the WLAN network encompasses a solution that exploits eNB controlled aggregation a-la LTE DC 3C solution, but it also provides a solution where the WIG can receive internet protocol (IP) packets from either the eNB or other network elements (S/P-GW). Such a solution covers both the case where more or less tight radio aggregation or offloading is used.

Figure 3:
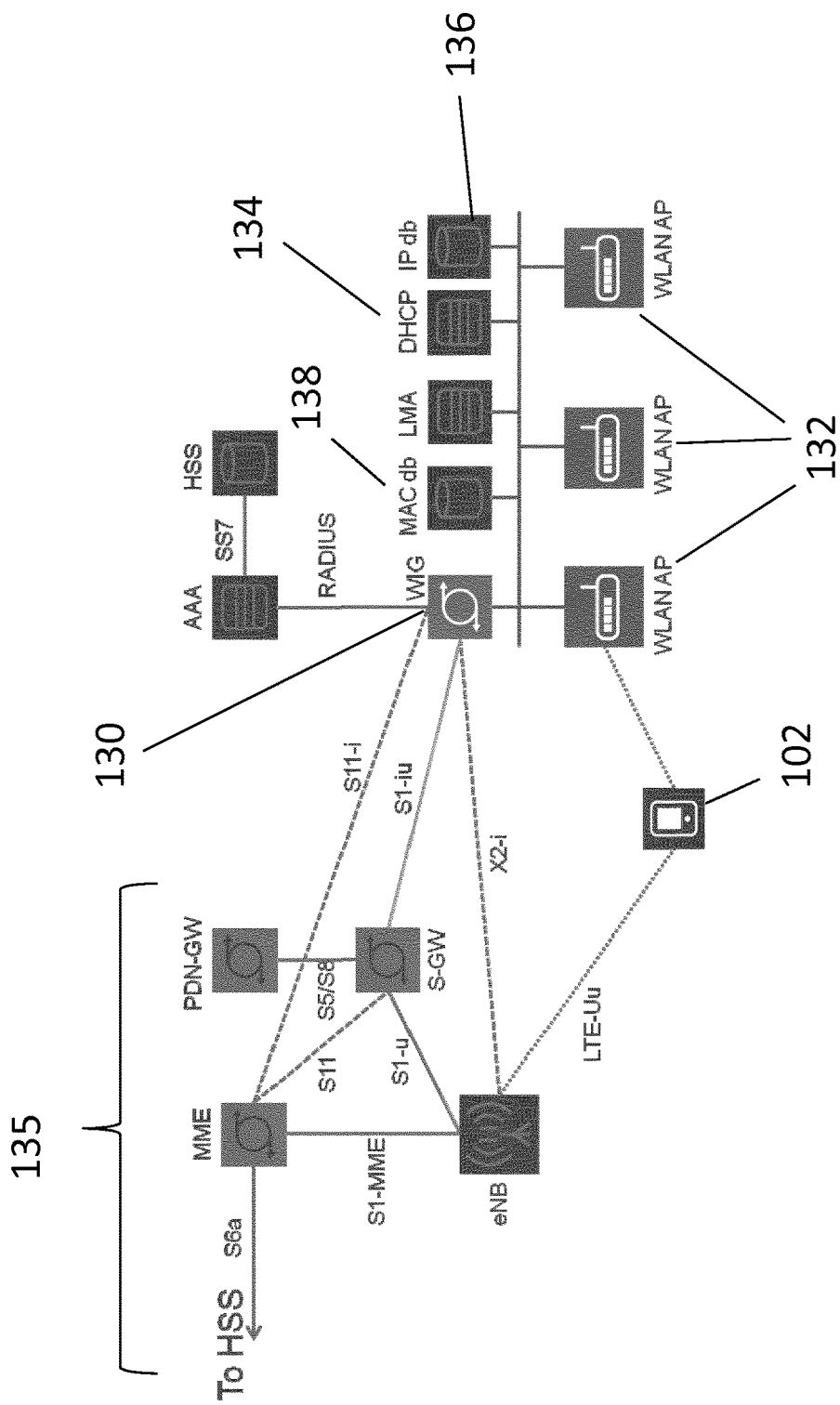
FIG. 3 shows a schematic diagram of an example WLAN network.

A legacy WLAN network is capable of standalone activity (i.e. independently carrying traffic of directly affiliated, and not offloaded UEs) also. An example of a WLAN network can be seen in FIG. 3. Such a network may be composed of at least: a WIG functionality 130, for communicating and interworking with a 3GPP RAN 135, a set of APs 132 that carry the traffic over the air to/from the network, a Dynamic Host Control Protocol 134 (DHCP or DHCPv6 in case of IPv6 network) server, able to independently assign the IP addresses to the standalone UEs, an IP addresses database 136 that collects the pool of the available IP addresses for use in the WLAN network (an IP addresses database may contain to which MAC address (UE) the IP address is bound to, and other information (e.g. but not limited to the time-to-live of such binding)). The WLAN can support dynamic MAC address assignment, for enhancing privacy and security. Such a feature may be based on a Local MAC Addressing (LMA) server.

The WLAN network may comprise a MAC address database 138, containing (but not limited to) the list of currently assigned and currently available MAC addresses to be used in the local network.

The Dynamic Host Control Protocol 134 may be used in IP networks for dynamically allocating and reclaiming IP addresses in the network. The protocol may enable the request of several IP parameters, and it is based on a client-server interaction model. The dynamic MAC address assignment (or Local MAC Addressing—LMA) is a technique similar to DHCP for enhancing privacy and security in public networks.

The Network Address Translation (NAT) is a set of techniques used for mapping an IP address into another while the packet is in transit in a routing device or a gateway. Such procedures may be used for IP masquerading, hiding internal IP addresses within a network to the external world. This feature is typically used into enterprise LANs. Translation generally is made between two IPv4 addresses (NAT44) or IPv6 and IPv4 address (NAT64).

MAC Authentication Bypass (MAB) is has been initially foreseen for authenticating in a network a device that has limited or no 802.1x capabilities. In particular, on a specific pre-configured port, the switch (or network element) act has authentication proxy basing the authentication on source MAC address.

Figure 4:
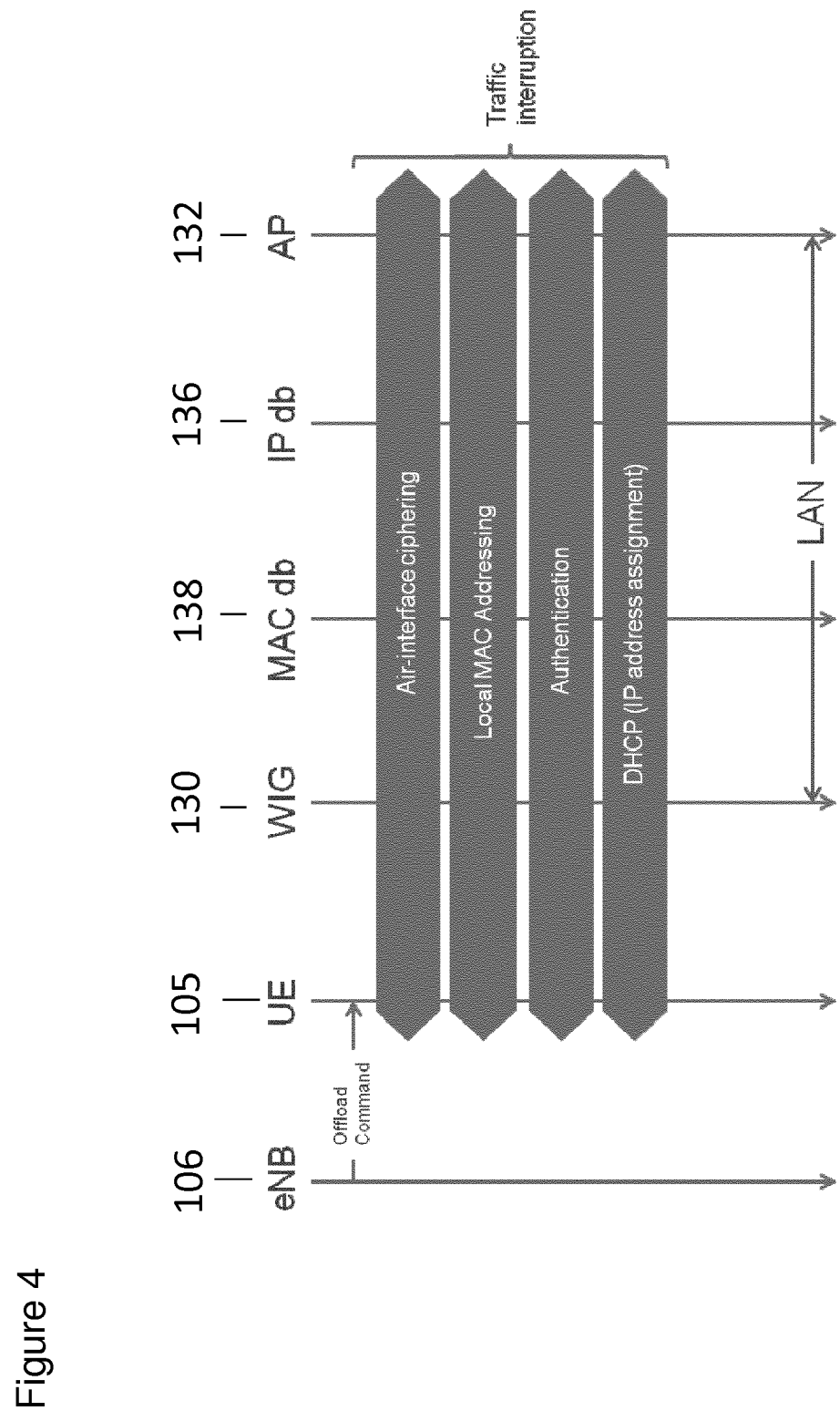
FIG. 4 shows a signalling diagram of an offloading procedure.

When initiating radio level packet aggregation between LTE and WLAN, or similarly when considering a UE handover command to WLAN, there are certain time consuming procedures in the WLAN network that the UE has to complete such as authentication, IP address and MAC address assignments before obtaining any service from the WLAN network. FIG. 4 shows an example messaging flow for UE offloading and re-connection to a WLAN network.

Figure 5A:
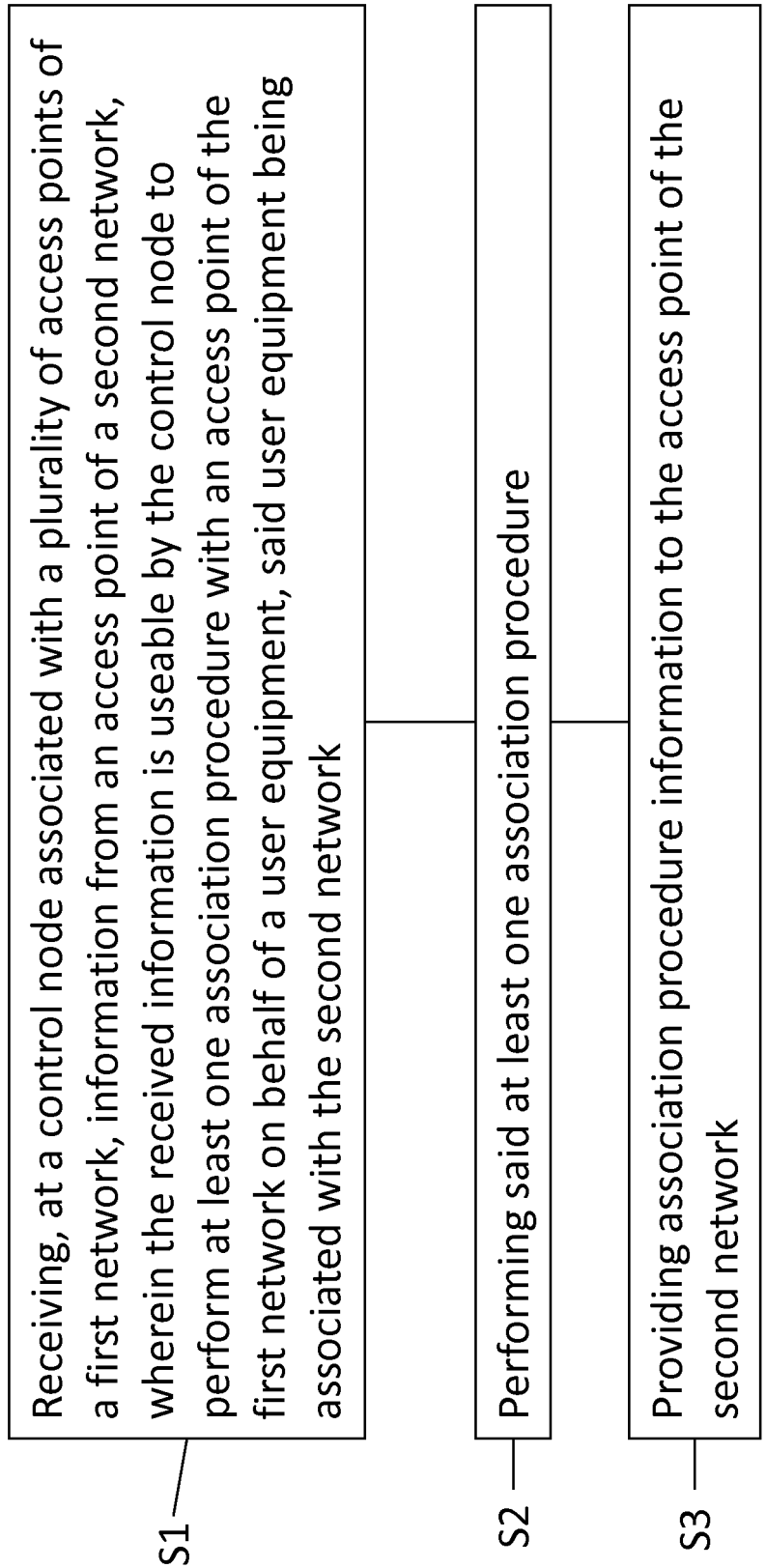
FIG. 5a shows a flowchart of an example method.

FIG. 5a shows a flowchart of an example method for setting up aggregation or offloading operations between 3GPP and WLAN networks according to an embodiment. In a first step, S1, the method comprises receiving, at a control node associated with a plurality of access points of a first network, information from an access point of a second network, wherein the received information is useable by the control node to perform at least one association procedure with an access point of the first network on behalf of a user equipment, said user equipment being associated with the second network.

In a second step, S2, the method comprises performing said at least one association procedure and, in a third step, S3, providing association procedure information to the access point of the second network.

Figure 5B:
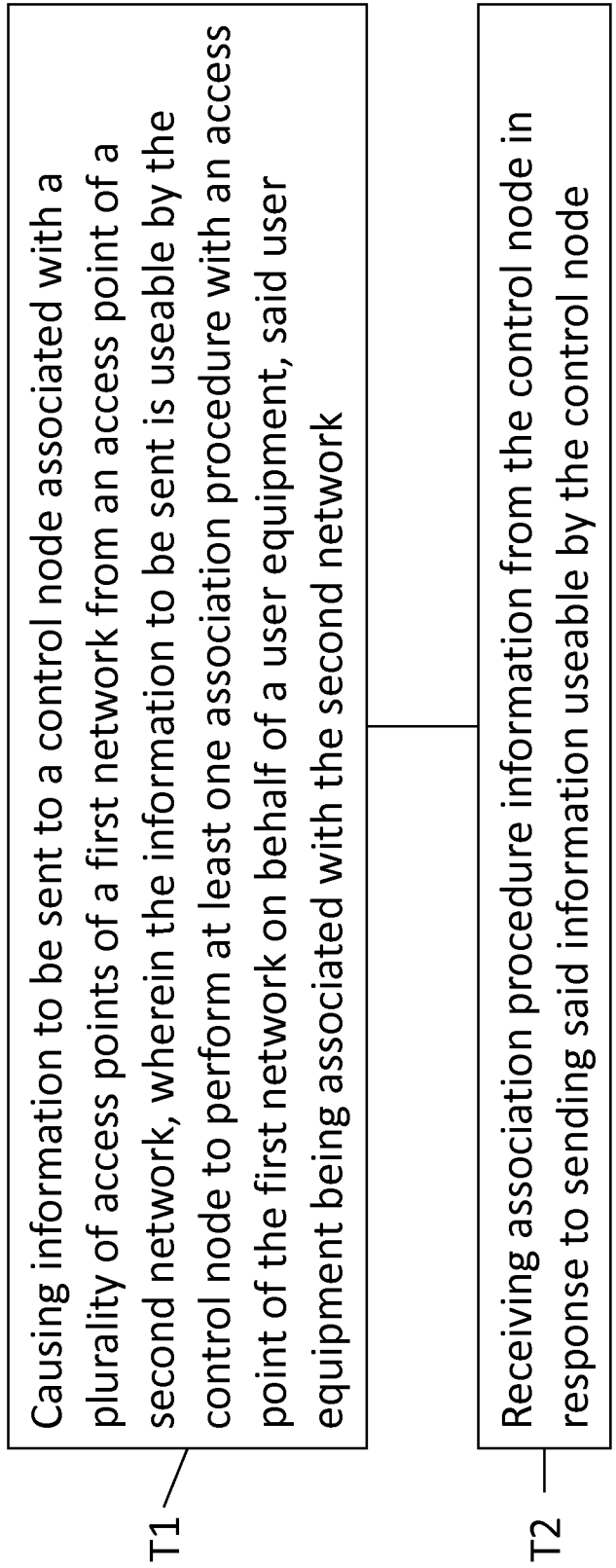
FIG. 5b shows a flowchart of an example method.

FIG. 5b shows a flowchart of an example method for setting up aggregation or offloading operations between 3GPP and WLAN networks according to an embodiment. In a first step, T1, the method comprises causing information to be sent to a control node associated with a plurality of access points of a first network from an access point of a second network, wherein the information to be sent is useable by the control node to perform at least one association procedure with an access point of the first network on behalf of a user equipment, said user equipment being associated with the second network. In a second step, T2, the method comprises receiving association procedure information from the control node in response to said information useable by the control node.

The first network may be a WLAN network and the second network may be a cellular, e.g. LTE, network. The control entity may be a dedicated entity which controls a plurality of access points of the first network, e.g. a WLAN network. The control entity may interface with an access point of the second network, e.g. an eNB of an LTE network. The control entity may be a WIG, or any other intermediating entity used to bridge a 3GPP network and WLAN network, e.g. WLAN controller or access point. Identity information associated with the UE, e.g. UE context and/or ID information may be caused to be transmitted to the AP of the first network. In a case where the AP connected to an eNB is not legacy, the AP may perform at least part of the association procedure.

The received information in step 1 of FIG. 5a may comprise identity information associated with at least one of a user equipment identity information and at least one AP of the first network. For example, the received information may comprise the identity information associated with a WLAN AP with which the UE should be associated. For example, the received information may comprise identity information for a prioritised list of access points of the first network, e.g. WLAN APs, for association with the UE. The control node may thus have freedom to perform resource allocation based on each AP load and/or any other suitable performance metrics.

The identity information may be a MAC address, or any other suitable AP identifier, e.g. BSSID. Identity information associated with the UE may comprise a UE MAC address. The received information may be determined at the AP of the second network (e.g. at the eNB) in dependence on information received from the UE.

In an embodiment, the received information may be comprised in a request message from an AP of the second network for offloading and/or initiating radio aggregation for a UE with the first network. The association procedure information may be provided as a response to the request message.

Performing an association procedure may comprise selecting the AP of the first network for the UE to associate with. The selection may be made in dependence on load information and/or access classes (QoS) based performance metrics associated with each of the plurality of APs of the first network. The selection may be at least partly based on the identity information of APs wherein the identity information is carried in the information received in step 1 of FIG. 5a. The identity information may be a priority list indicating several APs and the WIG then selects one of those. In an embodiment, the priority is based on signal strength of the APs as measured by the UE.

Performing an association procedures may comprise determining identity information applicable in the first network for the UE. The association procedure information may comprise an indication of the determined identity information applicable in the first network for the user equipment. The identity information applicable in the first network for the UE may be used in configuring the UE to associate with the first network.

Determining identity information applicable in the first network for the user equipment may comprise determining at least one of a local MAC address and a local IP address to be assigned to the UE. The control entity may be configured to perform, for example, LMA and DHCP proxying functionalities. For example, the WLAN local IP address to be used by the UE, obtained through a proxyed DHCP procedure and/or a LMA originated MAC address to be used by the UE may be provided to an eNB in the response message.

The association procedure may comprise performing an authentication procedure for the user equipment with the determined access point of the first network. For example, the control entity may be configured to perform authentication procedures, such as a MAB modified port authentication procedure for authorizing UE traffic (in both uplink (UL) and downlink (DL) directions). For example, the control entity may have AAA proxying functionality, the MAB signaling flows may be modified and the MAB behavior in the second network access points may be modified. The authentication procedure may comprise sending an unsolicited authorization method to the AP of the first network. The authorization message may comprise identity information associated with the user equipment.

The association procedure may comprise performing admission control to determine whether the UE is permitted to associate with the first network, e.g. based on UE subscription type (allocation and retention priority (ARP)) and requirements (e.g. guaranteed bit rate (GBR)). If a WLAN load is high, it may be a better option to keep the UE in the 3GPP RAT. Upon deciding that the UE is not permitted to associate with the first network, an indication to this effect may be provided to the AP of the second network.

The method may comprise receiving identity information from the UE, said identity information associated with the second network. The identity information may be the UE's 3GPP service IP address. The identity information may be received at a WIG via a non-access stratum (NAS)-type of message over a WLAN network. The WIG address can either be the default GW address or be specified in a command message received from an access point of the second network.

In an embodiment, the UE may report the detected WLAN APs for the purpose of WLAN offloading to the eNB of the second network. Event-trigger UE reporting may comprise, for example, the WLAN ID of the detected AP/WLAN network(s) which meet the configured event and additionally the measured RSSI and most updated BSS load. A preliminary part of the proposed mechanism may use the availability, at eNB side, of information related to the existence and characteristics of those WLAN networks within its coverage area. Such information, which may relate to the WLAN APs detected by the UE as potential candidate AP(s) for offloading, may be collected by the UE and sent as RRC messages to the eNB.

Once such information is collected and an offloading/aggregation decision made, the eNB should proceed in carrying out a method such as that of FIG. 5. An example implementation of such a procedure is shown in the signalling diagram of FIG. 6.

Figure 6:
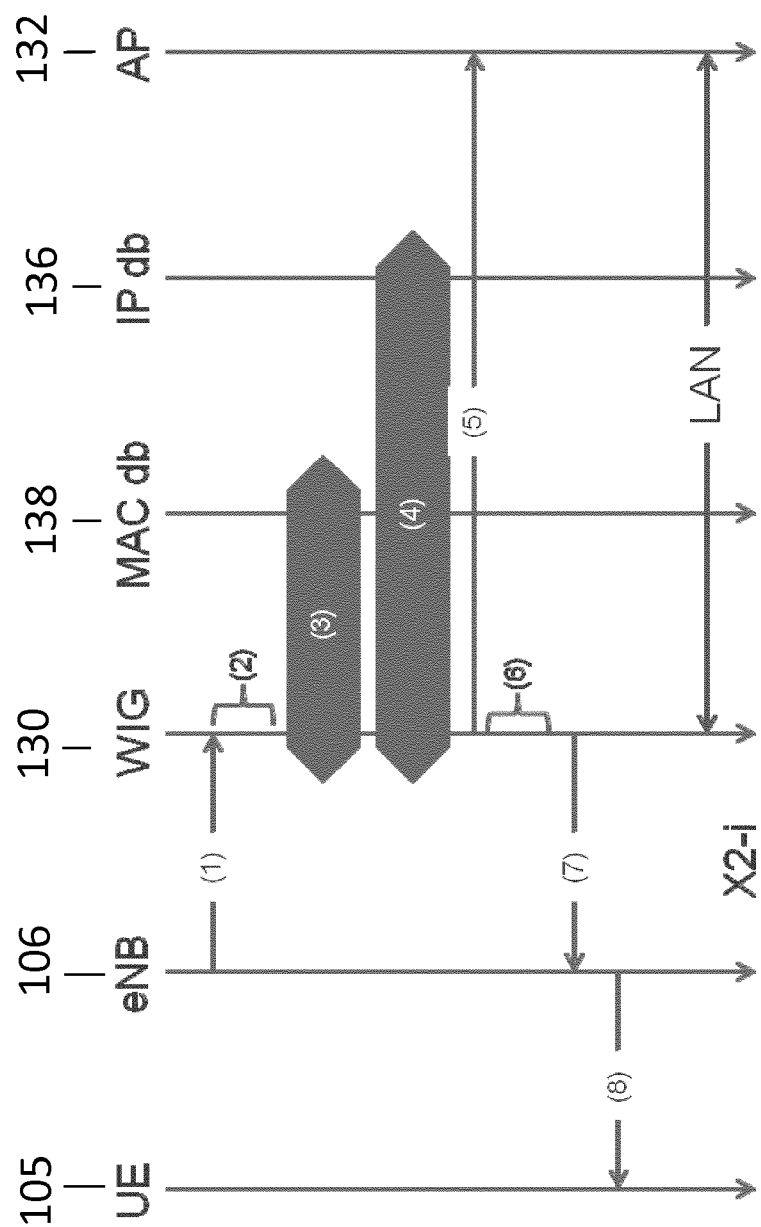
FIG. 6 shows a signalling diagram of an example offloading procedure according to an embodiment.

FIG. 6 shows a signaling diagram for an example UE offloading procedure from an LTE network to a WLAN network through a WIG entity in accordance with some embodiments.

In a first step an offload request (OFFLOAD_REQUEST) and/or aggregation request (AGGREGATION_REQUEST) is sent from the eNB 106 to the WIG 130. The eNB 106 sends a message for requesting the offloading of/initiating radio aggregation for a specific UE 105 to the WIG 130, in order to hand the UE traffic, or part of it, to the WLAN network. The message may contain, for example but not limited to, UE authentication ID and security keys, UE offloading capabilities: e.g. support for non seamless WLAN offloading (NSWO), Rel12 RAN-assisted WLAN interworking, Rel13 WLAN interworking, etc., E-UTRAN Radio Access Bearer (E-RAB) context and its respective requirements (e.g. quality of service class identifier (QCI), maximum bit rate (MBR), guaranteed bit rate (GBR), Allocation and Retention Priority (ARP)), the MAC address or other identifier of the AP, e.g. basic service set identification (BSSID), where the UE 105 should be affiliated and/or a list of identifiers of a plurality of APs; the UE MAC address, if either the UE 105 or the WLAN network is not capable of performing LMA. The 3GPP service IP address can also be exchanged, if and whenever available at eNB 106 or MME, if the WIG solution needs to perform IRT operations; in particular it refers to the WIG procedure where a certain IP destination address needs to be re-routed (through encapsulation) to a local WLAN IP address.

The E-RAB context may be used for running WLAN admission control. Admission of a new user will take into account his requirements. Quality of service (QoS) profile can also be taken into account by WIG for setting 802.1Q QoS flags into the Ethernet frame, or the DiffServ labels in the IP packets to be sent to UE. Furthermore, the AP shall take into account the 802.1Q labels and sort the packets in the proper access category (buffer) as defined by 802.11e.

The MAC address, or other suitable identifier of an AP may allow the UE 105 to look for APs with good coverage so that the UE 105 could inform the eNB 106 about those APs. The eNB 106 may send that information to WIG 130, which selects one of those APs. Then the WIG 130, via the eNB 106, may inform the selected AP 132 to the UE 105, via the eNB 106, (see step 7). The UE 105 may then associate with that specific selected AP 132.

In a second step, the WIG 130 may perform admission control operations which may be similar to 3GPP eNB control operations for UE mobility, therefore based on the UE subscription type (ARP) and requirements (e.g. GBR). If the WLAN load is high, a better option may be to keep the UE 15 in the 3GPP RAT, rather than degrading the UE performance in a best effort, unguaranteed one. Such operation may be, but not limited to, based e.g. on network load metrics sent by the AP management plane to the WIG 130.

In a third step, the WIG 130 may perform a query and response with the LMA server/MAC DB 138 for available local MAC addresses to be assigned to the UE 105. The WIG 130 may act as a proxy for LMA assignment on the WLAN network. Such a procedure could be based either in proxying existing and standardized mechanism, or on a direct database query-based procedure for UEs and networks that support LMA. This step is optional since the method may be used for UEs and networks that do not support LMA.

In a fourth step, the WIG 130 may perform a query and response for available WLAN local IP address to be assigned to the UE. The WIG 130 may act as a proxy for the IP assignment to the UE 105 in the WLAN network. Such procedure may be based on proxying a traditional DHCP (DHCPv6) procedure, IPv6 stateless address autoconfiguration (SLAAC) (network prefixes are only stored in the WIG and communicated back to the eNB), or a direct database query-based procedure. Such a procedure could be deactivated in a particular implementation when L2 tunneling could be used instead of allowing the UE to have a local IP address. In other words, the WIG may quickly and in an early-phase perform these actions which would otherwise be performed later between the UE and some WLAN entity.

In a fifth step, WIG 130 may perform AP port authentication for UE MAC address (device static or assigned) by modified version of MAC Authentication Bypass (MAB). The WIG 130 may act as authentication proxy for the UE 105 in the WLAN network. By trusting the information about UE 105 being authenticated in the 3GPP network provided by the eNB 106, the WIG 130 acts as an AAA server and may directly send to the AP(s) 132 a RADIUS Access-Accept message, containing the proper configuration for the specific UE MAC address. In this modified version, the AP(s) 132 is able to accept the port authentication message even if it has not issued any RADIUS Access-Request message and it has never seen any packet transmitted by such a UE MAC address. After the reception of the RADIUS Access-Accept message, the AP 132 shall authorize any traffic received on the WLAN interface by the authenticated UE MAC address. Such modification is suitable with software updates in the APs 132.

In a sixth step, the WIG 130 may create an entry in its own specific Interworking Routing (IR) table, in order to re-route the traffic to the proper AP 132 and then, through the 802.11 air interface to the WLAN UE interface. Such entry may be based on pairing (e.g. but not limited to) the E-RAB IDs or 3GPP service IP with the WLAN locally assigned IP address, and/or optionally the UE MAC address, that may be static or assigned through LMA. The 3GPP service IP address can be extracted from the first packet marked with a specific E-RAB ID, in the case the traffic is coming from IP packets forwarding over an X2-type interface or due to path switch connecting the WIG 130 with a P/S-GW. The specific IRT format may be dependent on the specific WIG protocol stack solution and implementation.

In a seventh step, the WIG 130 may send the eNB 106 a response to the offloading/aggregation request that may contain, amongst others, ACK (acknowledgment)/NACK (negative acknowledgement) for offloading, the assigned UE MAC address (if UE and WLAN network are LMA capable), the locally assigned IP address (or the network prefix in the case of IPv6 SLAAC is used), assigned AP MAC address (or other identifier such as BSSID) (e.g. from the list of preferred ones) where the UE should be affiliated, other (e.g. but not limited to maximum load allowed, such that the eNB can know how to split the bearer).

In one optional embodiment, the WIG 130 may send a request to the eNB 106 for the 3GPP service IP address. The 3GPP service IP address may be sent in a separate eNB-→WIG message or via a NAS-type message from the UE 105 through the WLAN network (see step 10). In some implementations that e.g. exploit only L2 methods for conveying data over the WLAN network, VLAN configuration parameters and IDs can be provided instead of IP-related information.

The eNB 106 may command the UE 105 to offload/initiate the aggregation operations through a RRC message as shown in step 8. The RRC message may contain, amongst others the MAC address, or other identifier such as BSSID, of selected AP for association, the locally assigned IP address in the WLAN network (or the network prefix in case the IPv6 SLAAC procedure is used), and optionally the assigned MAC address by the LMA. Such message could be created by eventually extending state of art messages already present in 3GPP RRC for offloading procedures or by creating a specific new RRC message (or adding new information elements to existing RRC messages). The message may contain the IP address of the WIG 130 in the WLAN network and the request for the 3GPP service IP address to be sent to the WIG 130.

In step 9, not shown in the figure, the UE 105 signals to the eNB 106 to acknowledge the command. This step may comprise implementation of a three-way handshake for ensuring that the UE 105 has correctly received the command. Such message may be sent by the UE 105 to the eNB 106 as an RRC message.

In a tenth step, not shown in the figure, after the connection to the WLAN network, if the COMMAND message requests it, the UE 105 may report to the WIG 130 its own 3GPP service IP address via an NAS-type of message over the WLAN network. The WIG address can either be the default GW address or be specified in the COMMAND message.

A method as described with respect to the examples above may provide a proactive proxying solution that may initiate certain time procedures in the WLAN network such as authorisation, IP and MAC address assignments on behalf of the UE before the UE is effectively either offloaded to the WLAN network (loose interworking) or radio aggregation operations (tight interworking) are initiated between the RAN and WLAN networks. The amount of management signaling on the air interface (especially the WLAN one) may be significantly reduced. By applying a proxying solution, it may rarely happen that a procedure on a wired network would fail.

The new specific NAT (or routing) table may be tailored for the specific WIG application and protocol stack. In this way it would be possible to make the services seamless, not requiring any IP address change.

The traffic flow during offloading nor while radio aggregation is enabled may not be interrupted, allowing for seamless offloading as in an intra-RAT handover. Effectively, as soon as the offload command is received, the UE would be immediately able to transmit and receive.

It should be understood that each block of the flowchart of FIGS. 5*a* and 5*b* and any combination thereof may be implemented by various means or their combinations, such as hardware, software, firmware, one or more processors and/or circuitry. Although the blocks are shown in a first order, the steps may be performed in any order, and/or may be performed as part of a single calculation/determination.

Figure 7:
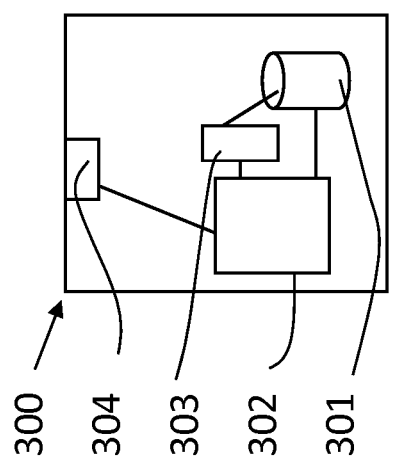
FIG. 7 shows a schematic diagram of an example control apparatus.

The method may be implemented on a mobile device as described with respect to FIG. 2 or control apparatus as shown in FIG. 7. FIG. 7 shows an example of a control apparatus for a communication system, for example to be coupled to and/or for controlling a station of an access system, such as a RAN node, e.g. a base station or (e) node B, or a node of a core network such as an MME, or a server or host, or a control node of a WLAN network, e.g. a WIG. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise receiving, at a control node associated with a plurality of access points of a first network, information from an access point of a second network, wherein the received information is useable by the control node to perform at least one association procedure with an access point of the first network on behalf of a user equipment, said user equipment being associated with the second network, performing said at least one association procedure; and providing association procedure information to the access point of the second network.

Alternatively or additionally, control functions may comprise causing information to be sent to a control node associated with a plurality of access points of a first network from an access point of a second network, wherein the information to be sent is useable by the control node to perform at least one association procedure with an access point of the first network on behalf of a user equipment, said user equipment being associated with the second network and receiving association procedure information from the control node in response to said information useable by the control node.

Figure 8:
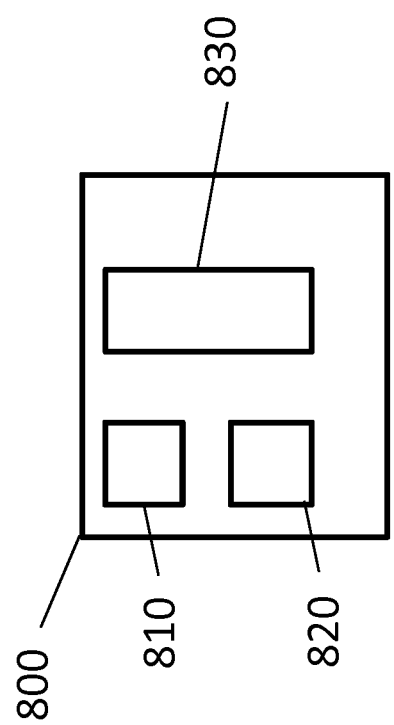
FIG. 8 shows a schematic diagram of an apparatus.

An example of an apparatus 800 shown in FIG. 8 comprises means 810 for receiving, at a control node associated with a plurality of access points of a first network, information from an access point of a second network, wherein the received information is useable by the control node to perform at least one association procedure with an access point of the first network on behalf of a user equipment, said user equipment being associated with the second network, means 820 for performing said at least one association procedure and means 830 for providing association procedure information to the access point of the second network.

Apparatus 800 may be included in a chipset or modem apparatus. A chipset or modem apparatus which includes apparatus 800 may be included in a control node such as a WIG.

Figure 9:
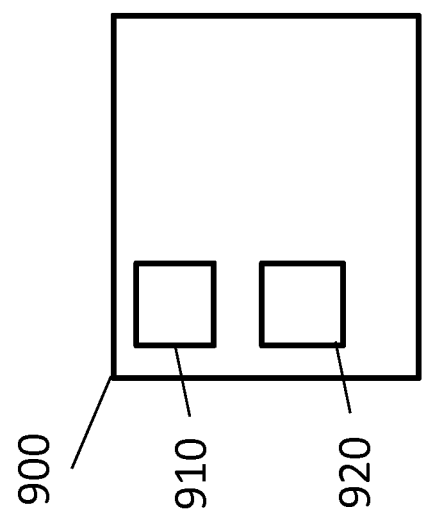
FIG. 9 shows a schematic diagram of an apparatus.

An example of an apparatus 900 shown in FIG. 9 comprises means 910 for causing information to be sent to a control node associated with a plurality of access points of a first network from an access point of a second network, wherein the information to be sent is useable by the control node to perform at least one association procedure with an access point of the first network on behalf of a user equipment, said user equipment being associated with the second network and means 920 for receiving association procedure information from the control node in response to said information useable by the control node.

Apparatus 900 may be included in a chipset or modem apparatus. A chipset or modem apparatus which includes apparatus 900 may be included in a base station and/or RNC.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 3GPP and WLAN, similar principles can be applied in relation to other cellular networks and wireless local area networks and to any other communication system where interworking between two networks is supported. For example, although the description assumed WLAN as the network of the second access point/node, the second network may be any other radio network as well. For example, the first access node may operate on a licensed band whereas the second access point may be operating on an unlicensed band (as in e.g. LTE-unlicensed, LTE-U, or licensed assisted access, LAA). Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

In an embodiment at least some of the functionalities of the apparatus of FIGS. 7-9 may be shared between two physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station, in the access point, or in the WIG, for example. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor and at least one memory including a computer program code, the at least one memory and the computer program code configured, with the at least one processor, to cause a control node associated with a plurality of access points of a first network at least to:
receive information from an access point of a second network in a request message for initiating radio aggregation for a user equipment with the first network, wherein the first network is a wireless local area network and the second network is a cellular network, wherein the received information is useable by the control node to perform at least one association procedure with an access point of the first network on behalf of the user equipment, said user equipment being associated with the second network, said received information comprising a media access control (MAC) address associated with the user equipment and at least one security key associated with the user equipment;
perform said at least one association procedure, wherein the at least one association procedure comprises performing an authentication procedure for the user equipment with the access point of the first network based on the user equipment being authenticated in the second network, the received MAC address and the received at least one security key, wherein the authentication procedure comprises the control node sending an authorization message to the access point of the first network without communication with an AAA server, the authorization message authorizing traffic received by the access point of the first network from the user equipment identified by the authorization message;
determine identity information applicable in the first network for the user equipment; and provide association procedure information as a response to the request message, wherein the association procedure information comprises an indication of identity information applicable in the first network for the user equipment.

2. The apparatus according to claim 1, wherein performing the association procedure causes the control node further to: provide association procedure information to the access point of the second network.

3. The apparatus according to claim 2, wherein determining the identity information applicable in the first network for the user equipment causes the control node further to: determine at least one of a local media access control address and a local internet protocol address to be assigned to the user equipment.

4. The apparatus according to claim 1, wherein performing the association procedure causes the control node further to:
perform admission control to determine whether the user equipment is permitted to associate with the first network; and upon deciding that the user equipment is not permitted to associate with the first network, indicate the determination to the access point of the second network.

5. The apparatus according to claim 1, wherein the at least one memory and the computer program code are configured, with the at least one processor, are configured, with the at least one processor, to cause the control node further to: receive identity information from the user equipment, said identity information being associated with the second network.

6. A method comprising:
receiving, at a control node associated with a plurality of access points of a first network, information from an access point of a second network in a request message for initiating radio aggregation for a user equipment with the first network, wherein the first network is a wireless local area network and the second network is a cellular network, wherein the received information is useable by the control node to perform at least one association procedure with an access point of the first network on behalf of a user equipment, said user equipment being associated with the second network, said received information comprising a media access control (MAC) address associated with the user equipment and at least one security key associated with the user equipment;
performing said at least one association procedure, wherein the at least one association procedure comprises performing an authentication procedure for the user equipment with the access point of the first network based on the user equipment being authenticated in the second network, the received MAC address and the received at least one security key, wherein the authentication procedure comprises the control node sending an authorization message to the access point of the first network without communication with an AAA server, the authorization message authorizing traffic received by the access point of the first network from the user equipment identified by the authorization message;
determine identity information applicable in the first network for the user equipment; and provide association procedure information as a response to the request message, wherein the association procedure information comprises an indication of identity information applicable in the first network for the user equipment.

7. An apparatus comprising:
at least one processor and at least one memory including a computer program code, the at least one memory and the computer program code configured, with the at least one processor, to cause the apparatus at least to: cause information to be sent to a control node associated with a plurality of access points of a first network from an access point of a second network in a request message for initiating radio aggregation for a user equipment with the first network, wherein the first network is a wireless local area network and the second network is a cellular network, wherein the information to be sent is useable by the control node to perform at least one association procedure with an access point of the first network on behalf of a user equipment, said user equipment being associated with the second network, said sent information comprising a media access control (MAC) address associated with the user equipment and at least one security key associated with the user equipment, and wherein the information is configured for performance of an authentication procedure with the access point of the first network based on the user equipment being authenticated in the second network, the MAC address and the at least one security key, wherein the authentication procedure comprises the control node sending an authorization message to the access point of the first network without communication with an AAA server, the authorization message authorizing traffic received by the access point of the first network from the user equipment identified by the authorization message, wherein the first network is a wireless local area network and the second network is a cellular network;

determine identity information applicable in the first network for the user equipment; and receive association procedure information as a response to the request message, wherein the association procedure information comprises an indication of identity information applicable in the first network for the user equipment.

8. The apparatus according to claim 7, wherein the information to be sent further comprises identity information associated with at least one access point of the first network.

9. The apparatus method according to claim 7, wherein the at least one memory and the computer program code are configured, with the at least one processor, to cause the apparatus further to: determine said information to be sent in dependence on information received from the user equipment.

10. The apparatus according to claim 7, wherein the at least one memory and the computer program code are configured, with the at least one processor, to cause the apparatus further to: receive association procedure information from the control node in response to sending said information useable by the control node; and cause an indication to be sent to the user equipment to associate with the first network, the indication comprising at least a portion of association procedure information.

11. The apparatus according to any claim 10, wherein the at least one memory and the computer program code are configured, with the at least one processor, to cause the apparatus further to: cause identity information associated with the user equipment to be transmitted to the access point of the first network.

* * * * *